(No Model.) 3 Sheets—Sheet 1.
G. W. MINGS.
CALIPERING INSTRUMENT.
No. 554,524. Patented Feb. 11, 1896.
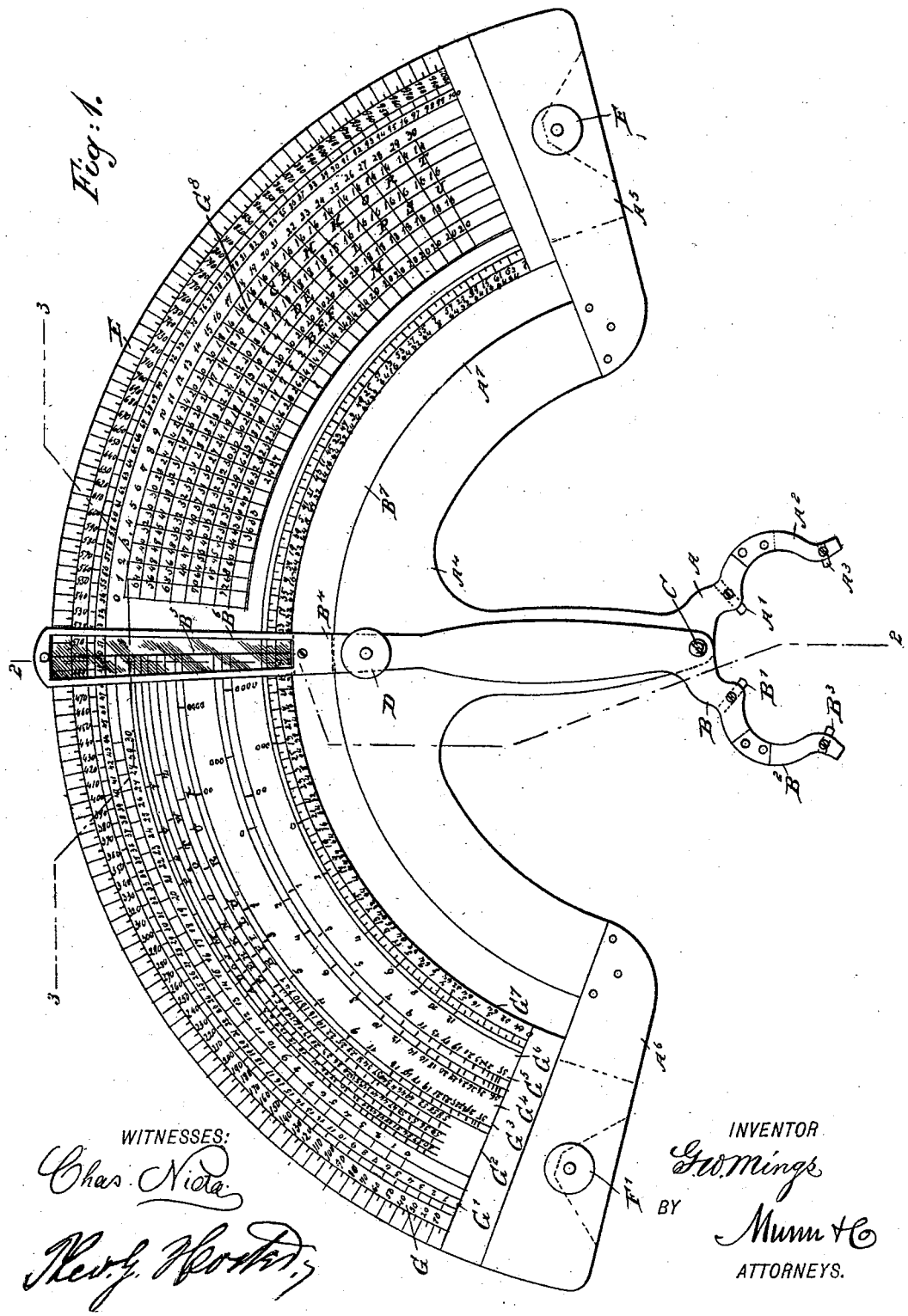
WITNESSES:
Chas. Nida
Theo. J. Hooker
INVENTOR
G. W. Mings
BY
Munn & Co
ATTORNEYS.

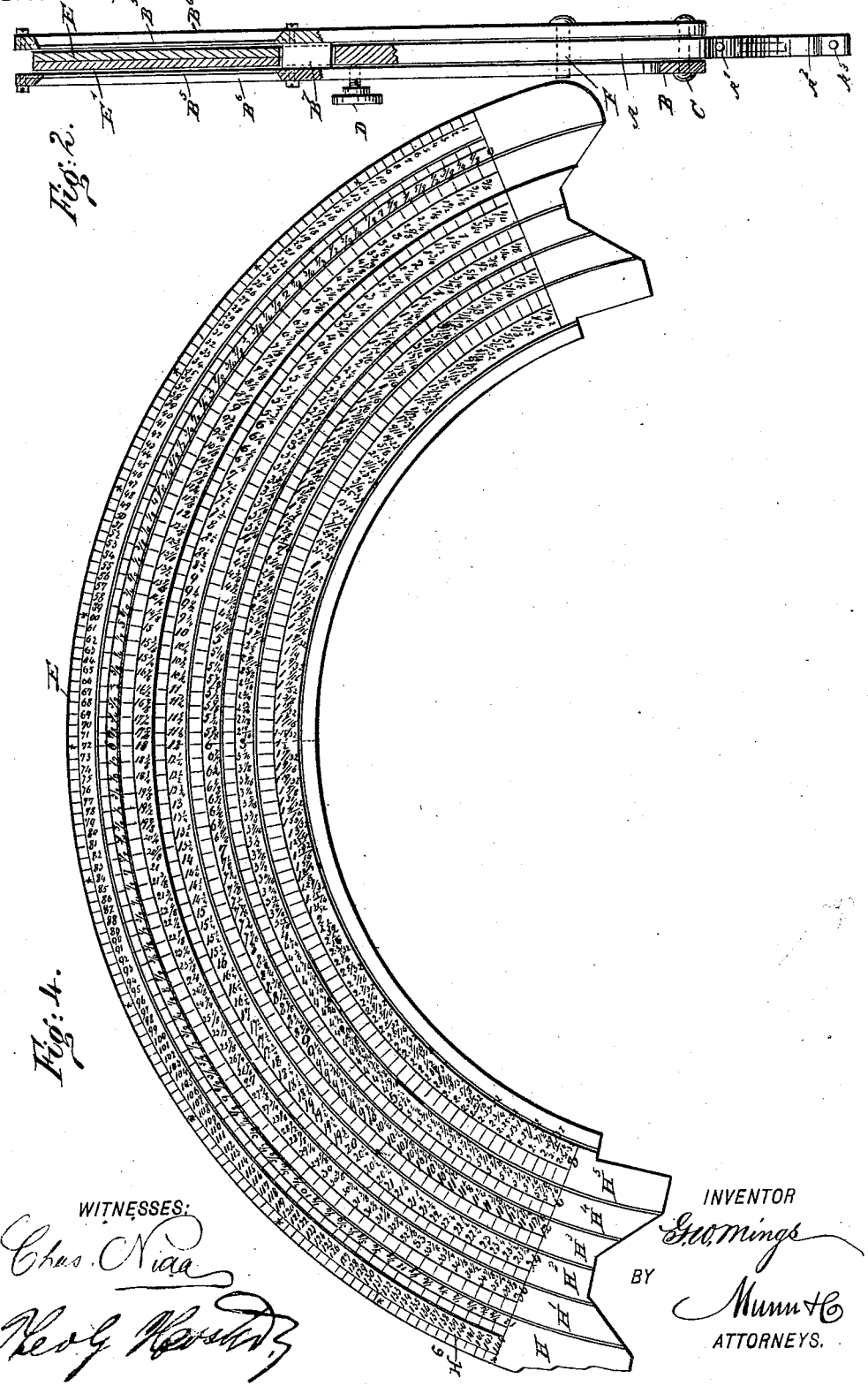

(No Model.) 3 Sheets—Sheet 3.

G. W. MINGS.
CALIPERING INSTRUMENT.

No. 554,524. Patented Feb. 11, 1896.

WITNESSES:
Chas. Niola
Theo. G. Hoster

INVENTOR
G. W. Mings
BY Munn & Co
ATTORNEYS.

ANDREW B.GRAHAM, PHOTO-LITHO, WASHINGTON, D.C.

UNITED STATES PATENT OFFICE.

GEORGE W. MINGS, OF HOLY CROSS, COLORADO.

CALIPERING-INSTRUMENT.

SPECIFICATION forming part of Letters Patent No. 554,524, dated February 11, 1896.

Application filed June 15, 1895. Serial No. 552,906. (No model.)

*To all whom it may concern:*

Be it known that I, GEORGE W. MINGS, of Holy Cross, in the county of Eagle and State of Colorado, have invented a new and Improved Calipering-Instrument, of which the following is a full, clear, and exact description.

The object of the invention is to provide a new and improved calipering-instrument designed for various purposes—such, for instance, as calipering or gaging wire and other articles, and automatically indicating the size of the article thus gaged in standard and other measurements.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 5:
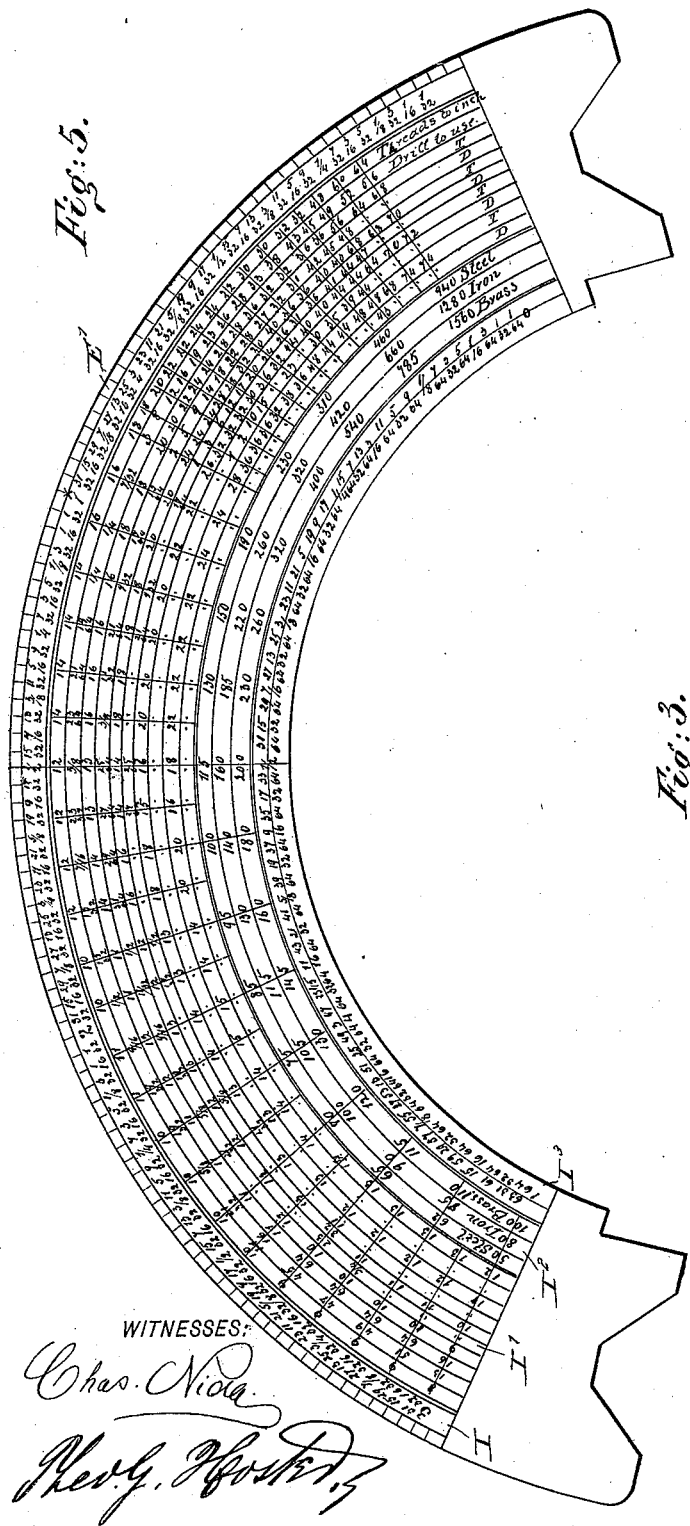
Figure 3:
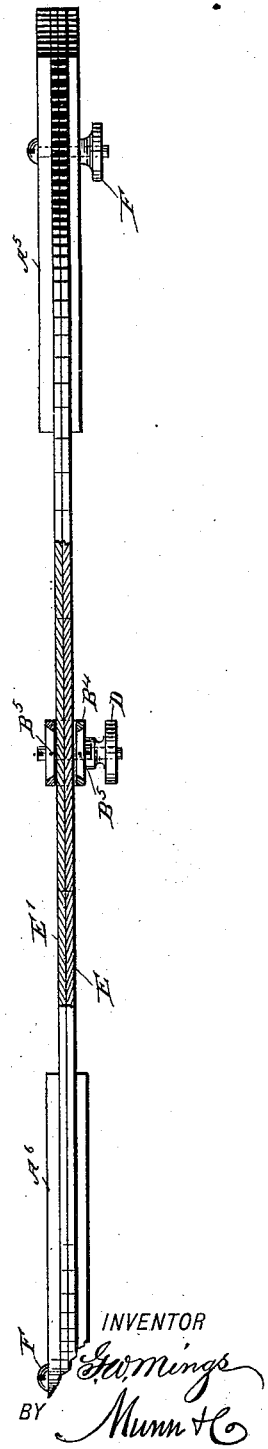

Figure 1 is a face view of the improvement. Fig. 2 is a transverse section of the same on the line 2 2 of Fig. 1. Fig. 3 is a sectional plan view of the same on the line 3 3 of Fig. 1. Fig. 4 is a face view showing the reverse of one dial, and Fig. 5 is a like view showing one face of the other dial.

The improved calipering-instrument is provided with calipers having the two members A and B pivotally connected with each other at C, the member A being provided with an adjustable point A', and a similar point B' is formed on the other member B, the two points A' and B' serving to gage the article, the range of the two points being from zero to one inch.

In order to measure larger articles, I provide the members A and B with extensions $A^2$ and $B^2$, provided with adjustable pins $A^3$ and $B^3$, respectively, arranged to measure articles from zero to three inches. It is, however, understood that I do not limit myself to the measurements mentioned, as the members may be increased to measure larger objects.

The member A is extended beyond the pivot C to form a segmental frame $A^4$, provided at its ends with radially-extending arms $A^5$ and $A^6$, adapted to form seats for the ends of one or more dials E E', on which indicates a pointer or hand $B^4$, forming an extension of the other caliper member, B, as shown in the drawings. The pointer $B^4$ is adapted to be clamped in place on the frame $A^4$ by a clamping-screw D, and the said pointer is preferably made fork-shaped, so as to indicate on the two exposed faces of the dials. The pointer $B^4$ is also provided on each arm with a radially-extending reading wire or hair $B^5$, over which is arranged a magnifying-glass $B^6$, so that the operator or user of the instrument can readily read the figures on the dials indicated by the wire or hair $B^5$ when the caliper is in use.

The two forked members of the pointer $B^4$ are connected with each other by a block $B^7$, fitted to slide on the segmental periphery $A^7$ of the arm $A^4$ and on the inner segmental edges of the dials E E'. (See Figs. 1 and 2.) The forked arms $A^5$ and $A^6$ are provided with clamping-screws F F', so as to bind the members of the fork on the ends of the dials to securely hold the latter in place. The dials are preferably provided with notches and shoulders, as indicated in the drawings, to properly fit into the forked arms $A^5$ and $A^6$.

The dials E and E' are provided on each face with graduations representing various measurements, scales and the like, and as the said dials can be readily taken out of the forked arms $A^5$ and $A^6$ and reversed or replaced by others, I am able to make use of the calipers for indicating all kinds of measurements. As shown, for instance, in Fig. 1, the front face of the dial E is provided near its outer edge with a scale G of .001 to the inch, which can be read to .0001 by the magnifying-glass $B^6$. A screw-gage G' is arranged next to the gage G, and then follows a drill-gage $G^2$, on which No. 1 drill is .2280 of an inch. The next scale, $G^3$, is for music-wire, and the following one, $G^4$, is for a wire-gage of London measurement. The scale $G^5$ is for a wire-gage according to the English standard. The scale $G^6$ is an American standard wire-gage, and the scale $G^7$ at the inner edge of the dial E indicates one sixty-fourth of an inch.

A table $G^8$ for calculating the size of a drill or number of drills to use for certain sizes of taps is arranged on the right-hand side of the dial E, as is plainly shown in Fig. 1. For instance, with No. 1 tap, with sixty-four threads to the inch, is indicated at No. 56 drill, whenever the wire $E^5$ is brought upon the numeral 1. It is understood that this whole table reads in connection with the scales $G^2$, $G^3$, $G^4$ and $G^5$.

As shown in Fig. 4, the reverse side dial E is provided with a number of graduations H, $H'$, $H^2$, $H^3$, $H^4$ and $H^5$, indicating scales, and of which the graduation is formed with an outer set of consecutive numerals $H^6$, indicating inches, and an inner set indicating the feet. The graduations $H'$ to $H^5$ are scales relative to the numerals $H^6$—that is, $H'$ is 4:1, $H^2$ is 6:1, $H^3$ is 12:1, $H^4$ is 24:1, and $H^5$ is 48:1 relative to $H^6$.

The dial $E'$ (shown in Fig. 5) is provided on one face with tables I, $I'$, $I^2$ and $I^3$, which are similar to the table $G^8$, Fig. 1, with the difference that table $G^8$ is marked from 1 to 30, while table $I'$ indicates from one sixty-fourth to one inch. Table I is for reading the large calipers up to three inches. Table $I^2$ is for calculating the number of revolutions per minute a certain size drill should run in steel, iron or brass. For instance, a fifteen-sixteenths inch drill should run sixty-two revolutions per minute in steel, eighty-five revolutions in iron and one hundred and ten revolutions in brass. $I^3$ is a table of one sixty-fourth for small calipers. On the reverse face of this dial $E'$ is arranged a taper gage and other matter; but it is understood that any desired scales, tables and the like may be arranged on the dials, and the latter can be removed from the forked arms $A^5$ and $A^6$ and reversed or replaced by others of a similar character.

Having thus described my invention, I claim as new and desire to secure by Letters Patent—

1. A device of the class described, comprising calipers having two members pivotally connected with each other, one of said members extending beyond the pivot and forming a segmental frame provided at its ends with forked arms, one or more segmental dials set in the said arms, clamping-screws for binding the members of the forked arms on the ends of the dials, a pointer forming an extension on the other caliper member, the said pointer being fork-shaped to indicate on the two exposed faces of the dials, a block connecting the forked members of the pointer and fitted to slide on the periphery of the segmental frame and on the inner segmental edges of the dials, and a clamping-screw carried by the said pointer to clamp the pointer on the segmental frame, substantially as shown and described.

2. A device of the class described comprising calipers having two members pivotally connected with each other and provided with sets of adjustable pins, one of said members being provided with a frame having arms at its ends, the said arms being adapted to form seats for the ends of one or more dials, and a pointer extending from the other member of the caliper and adapted to indicate on the said dials, substantially as shown and described.

3. A device of the class described, comprising calipers having two members pivotally connected with each other and provided with sets of adjustable pins for measuring small and large articles, one of the said members being provided with a frame having forked arms, and one or more segmental dials adapted to be inserted and clamped in the said forked arms, and a pointer extending from the other member of the calipers and indicating on the said dials, the said pointer being provided with a reading wire or hair, substantially as shown and described.

4. A device of the class described, comprising calipers having two members pivotally connected with each other and provided with sets of adjustable pins for measuring small and large articles, one of the said members being provided with a frame having forked arms, and one or more segmental dials adapted to be inserted and clamped in the said forked arms, a pointer extending from the other member of the calipers and indicating on the said dials, the said pointer being provided with a reading wire or hair, and a magnifying-glass held on the said pointer over the said wire or hair, substantially as shown and described.

5. A device of the class described, comprising calipers having two members pivotally connected with each other and provided with sets of adjustable pins measuring small and large articles, one of the said members being provided with a frame having forked arms, and one or more segmental dials adapted to be inserted and clamped in the said forked arms, a pointer extending on the said dials, the said pointer being provided with a reading wire or hair, a magnifying-glass held on the said pointer over the said wire or hair, and a clamping-screw for attaching the said pointer to the said frame, substantially as shown and described.

GEORGE W. MINGS.

Witnesses:
JAMES MILLS,
TOM PUNSHON.